United States Patent [19]

Verkins et al.

[11] 4,050,971
[45] Sept. 27, 1977

[54] DEVICE FOR FUSING LENGTHS OF FILM OVER THE OPEN ENDS OF CUPS

[75] Inventors: Wayne R. Verkins, St. Anthony; Richard T. Podvin, Fridley; Karl Frederick Rist, III, Oakdale, all of Minn.

[73] Assignee: Minnesota Mining and Manufacturing Company, St. Paul, Minn.

[21] Appl. No.: 659,234

[22] Filed: Feb. 19, 1976

[51] Int. Cl.² .............................................. B65B 7/00
[52] U.S. Cl. ....................................... 156/69; 53/296; 156/270; 156/468; 156/522; 156/527; 156/552; 156/576; 156/583
[58] Field of Search ................. 156/69, 522, 523, 527, 156/270, 468, 543, 574, 576, 583, 552; 53/296, 297, 298

[56] References Cited

U.S. PATENT DOCUMENTS

| | | | |
|---|---|---|---|
| 3,033,737 | 5/1962 | Peters | 156/522 |
| 3,286,437 | 11/1966 | Cole | 53/296 |
| 3,501,896 | 3/1970 | Stoeser et al. | 53/296 |

Primary Examiner—Edward G. Whitby
Attorney, Agent, or Firm—Cruzan Alexander; Donald M. Sell; William L. Huebsch

[57] ABSTRACT

A device for applying lengths of a heat sealable film over the open ends of cups. The device includes means which engage the end of a supply length of the film which is coiled in a cartridge, pull a predetermined length of the film from the cartridge, move the cup and predetermined length of film into engagement, heat fuse the film to the lip of the cup, and cut the fused length of film from the supply length at the cartridge.

10 Claims, 8 Drawing Figures

4,050,971

DEVICE FOR FUSING LENGTHS OF FILM OVER THE OPEN ENDS OF CUPS

BACKGROUND OF THE INVENTION

This invention relates to devices for positioning an end portion of a supply roll of heat sealable film over the open end of a cup or similar shaped container, moving the cup and film end portion into engagement, heat fusing the film to the lip of the cup, and cutting the fused film end portion from the supply roll.

U.S. Pat. Nos. 3,286,437 and 3,501,896 describe such devices in which the supply roll of film is rotatably mounted on the device, and the means for advancing an end portion engages the film adjacent the supply roll and pushes an end portion of the film over the application station from whence the end portion is heat sealed to the lip of a cup and severed from the roll. Since the film is pushed to the application station over the cup, the device provides no assurance that wrinkles will not be induced into flexible film, which wrinkles could result in an improper seal between the film and the cup.

SUMMARY OF THE INVENTION

The present invention provides a device of the type which applies heat sealable film over the open circular ends of cups or other containers, which device pulls the film over the cup at the application station so that wrinkles in the sealed film will be restricted even when very flexible film is used.

According to the present invention there is provided a device for applying predetermined lengths of a heat sealable film over the open end of a cup or other container positioned in the device from a supply length of the film on the device. The device comprises means for engaging and pulling an end of the strip of heat sealable film over the cup so that movement of the film is assured, and even very flexible film will not wrinkle. Means is also provided for bringing the lip of the cup into full circle engagement with the film over the cup, as are a means for subsequently applying heat and pressure to fuse the predetermined length of film to the lip of the cup, and means for severing the applied predetermined length of film from the supply length.

Preferably, the device applies the film from a cartridge assembly which preserves the sanitation of the film. The cartridge assembly comprises a cylindrical roll of heat sealable film, and a housing supporting and enclosing the roll and formed with an outlet slot through which an end of the film exits. The means for engaging an end of the strip of heat sealable film comprises clamp means adapted for engaging the film adjacent its terminal end at the outlet of the cartridge and means for advancing the clamp means to pull the predetermined length of the film from the cartridge.

Also, preferably the means for relatively moving a cup supported on the device and the predetermined length of film to bring them into engagement drives the means for advancing the clamp means via means which move the clamp means the same predetermined distance prior to such engagement for any cup in a predetermined range of heights.

BRIEF DESCRIPTION OF THE DRAWING

The present invention will be more fully understood after a careful reading of the following detailed description which refers to the accompanying drawing wherein like numbers refer to like parts in the several figures, and wherein.

DESCRIPTION OF THE PREFERRED EMBODIMENT

Figure 1:
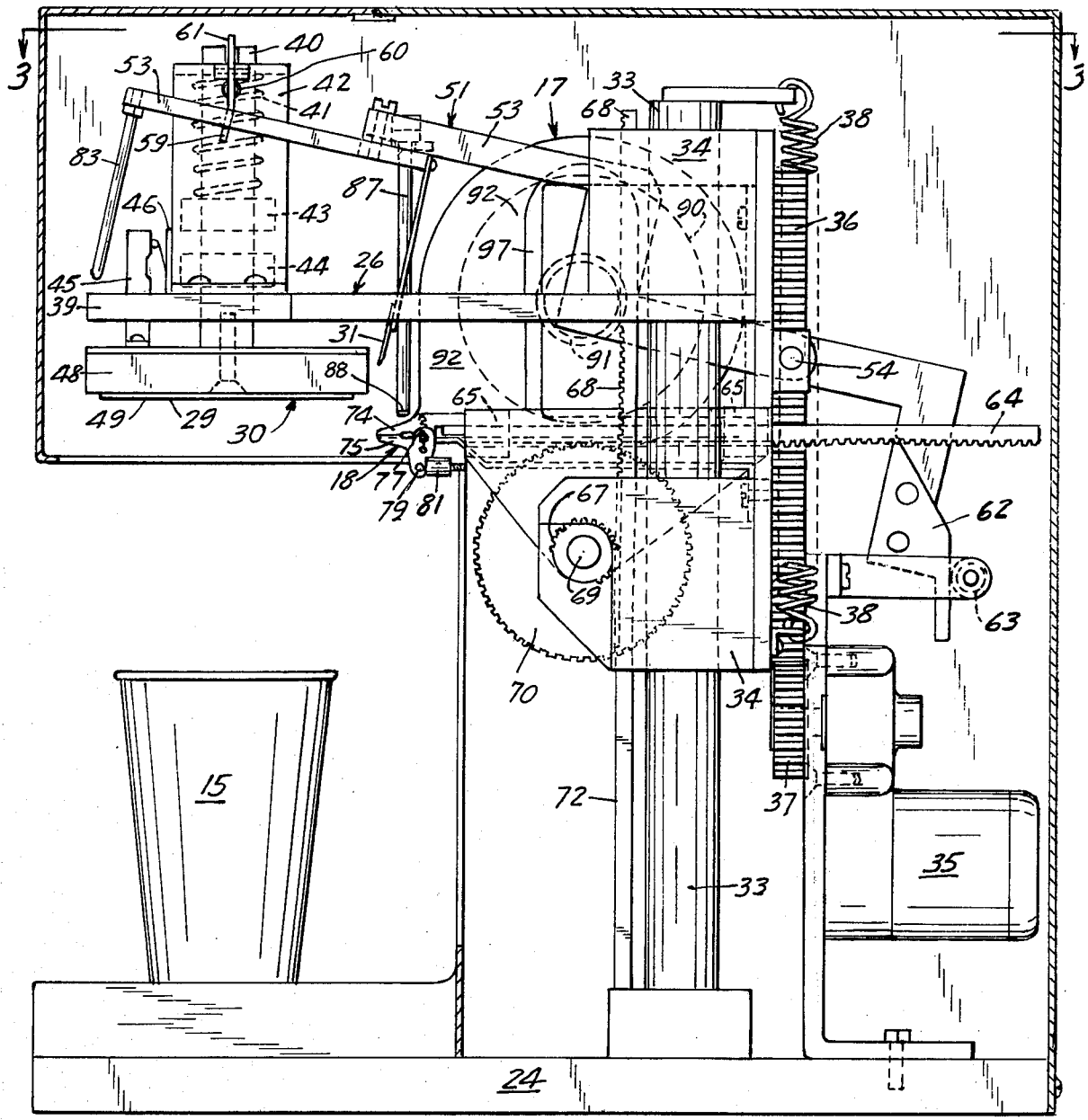
FIG. 1 is a vertical sectional side view of a device according to the present invention having parts broken away to show details.

Referring now to the drawing there is illustrated a device according to the present invention, generally designated by the numeral 10. The device is adapted for applying rectangular predetermined lengths of a heat sealable film 12 over the open end of a cup such as the cup 15 illustrated from a supply length of the film 12 stored in a cartridge assembly 17.

Figure 4:
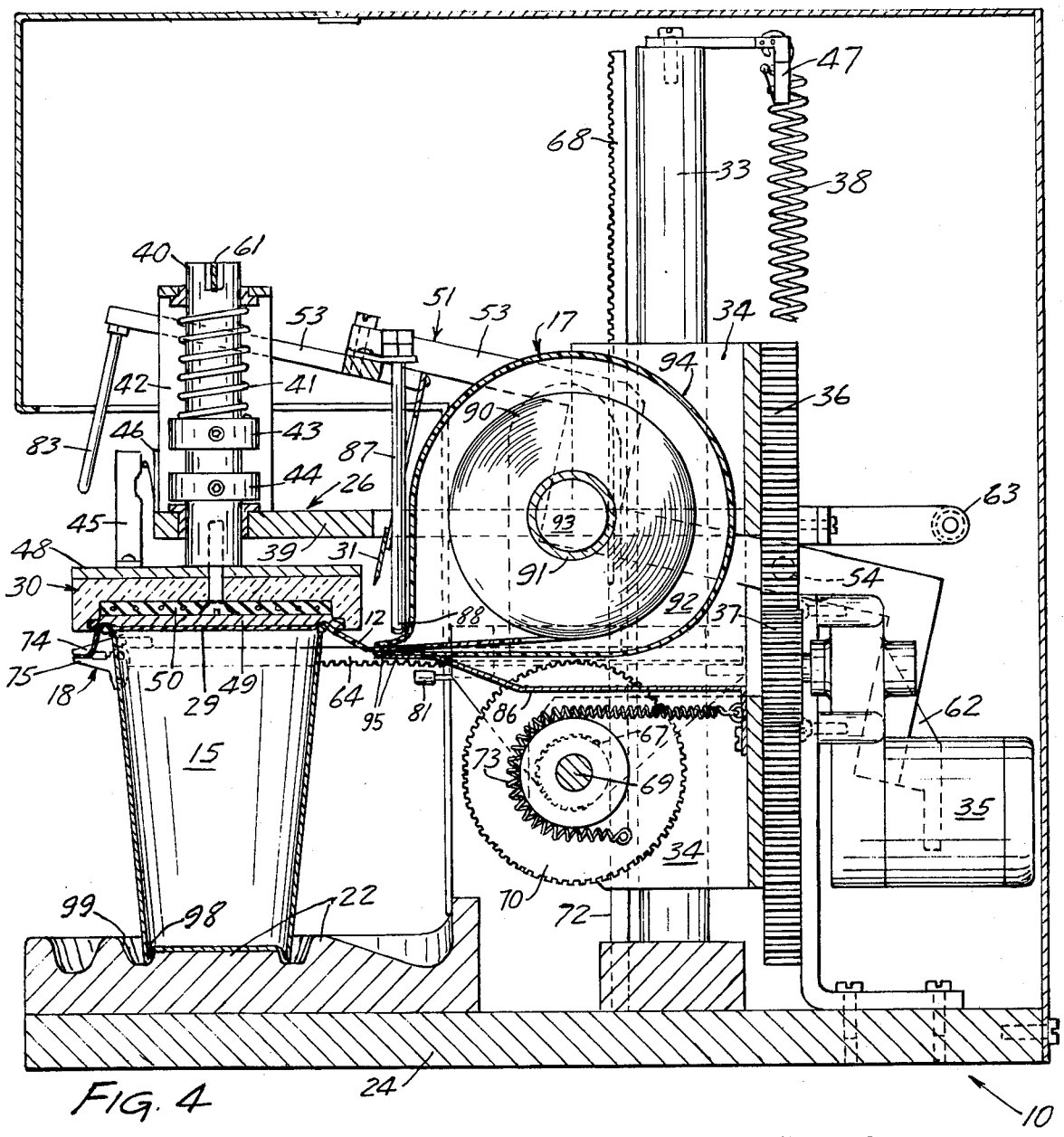
FIG. 4 is a vertical sectional view taken approximately along the line 4—4 of FIG. 3 but shown with a head assembly on the device in a contact position pressing film against a cup in the device.
Figure 8:
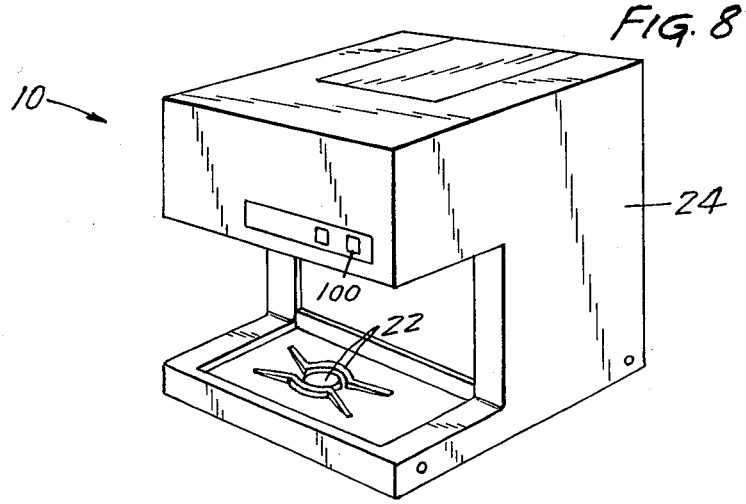
FIG. 8 is a perspective view of the device of FIG. 1.

Briefly, the device 10 comprises clamp means including two clamp assemblies 18 adapted for engaging an end of the supply length of the film 12 at the cartridge assembly 17 and means for advancing the clamp assemblies 18 and an engaged end of the film 12 along a path from a first or retracted position (FIG. 1) to a second or extended position (FIGS. 4 and 5), which positions are spaced a distance equal to the predetermined length of the film 12 to be applied. Inner and outer circular concentric bosses 22 on a frame 24 of the device 10 are adapted to receive, center and support the base of any one of several sizes of cups with differing heights. Means are included for providing relative movement between a cup supported on the bosses 22 and a predetermined length of the film 12 along the path via movement of a head assembly 26 on which the clamp assemblies 18 are movably mounted relative to the frame 24 to bring an annular lip of the cup into full circle engagement with one surface of the predetermined length of film. The device 10 also includes means for applying heat and pressure to fuse the predetermined length of film to the lip of the cup, including a heated platen 30 included in the head assembly 26 and having a pressure surface 29 adapted to press and fuse the film to the lip of the cup. Means comprising a knife 31 is also provided for severing the applied length of film 12 from the supply length at the cartridge assembly 17, thereby cutting the sealed cup loose from the supply length of film 12.

The means for providing relative movement between a cup and a predetermined length of the film 12 comprises two parallel shafts 33 on which the head assembly 26 is mounted by sliding bearings 34 for movement between (1) a spaced position (FIG. 1) at which the platen 30 is spaced from the bosses 22 at a distance somewhat greater than the maximum height of a cup to be sealed to afford insertion of the cup on the bosses 22 under the platen 30 and movement of the clamp assemblies 18 to position a predetermined length of the film 12 between the platen 30 and the cup; and (2) any position within a range of contact positions at which the platen 30 will press the predetermined length of the film 12 positioned between the platen 30 and the cup into engagement with the lip of the cup supported on the bosses 22. A reversible gear motor 35 mounted on the frame 24 drives a rack 36 attached to the head assembly 26 via a gear 37 to move the head assembly 26 between its spaced position and its range of contact positions. Two springs 38 attached between the head assembly 26 and the ends of the shafts 33 help to counteract the weight of the head assembly so that the motor 35 may more easily return the head assembly 26 to its spaced position.

The head assembly 26 comprises a support member 39 in which the sliding bearings 34 are fixed, and the platen 30 to which is fixed a cylindrical rod 40 projecting normally away from its pressure surface 29. The rod 40 is mounted on the support member 39 for axial sliding motion in a direction generally parallel with the shafts 33 and to present the pressure surface 29 so that it will make full circle engagement with the lip on a cup supported on the bosses 22 when the head assembly 26 moves through its range of contact positions. A compressed spring 41 retained around the rod 40 between an inverted U-shaped portion 42 of the support member 39 and a collar 43 biases the platen 30 toward the bosses 22 to a position at which a stop ring 44 fixed to the rod 40 engages the support member 39. Upon forceful engagement of the pressure surface 29 of the platen 30 against the lip of a cup through a length of the film 12 as the head assembly 26 moves through its range of contact positions, the platen 30 and rod 40 will move relative to the support member 39 against the bias of the spring 41 until the spring 41 transfers a predetermined force to the cup via the surface 29 (e.g. 25 to 30 pounds) and a groove in a cam arm 45 carried by the platen 30 moves adjacent to the actuator on a first snap action switch 46 carried by the support member 39. The actuator of the first snap action switch 46 then moves into the groove in the cam arm 45 which pulses an electrical control circuit for the device 10. Upon receiving the pulse, the control circuit stops the motor 35 for a predetermined dwell time and then reverses the motor 35 to return the head assembly 26 to its spaced position which is signaled to the control system when a second snap action switch 47 fixed to the frame 24 is engaged by the support member 39 so that the motor 35 is again stopped.

Figure 5:
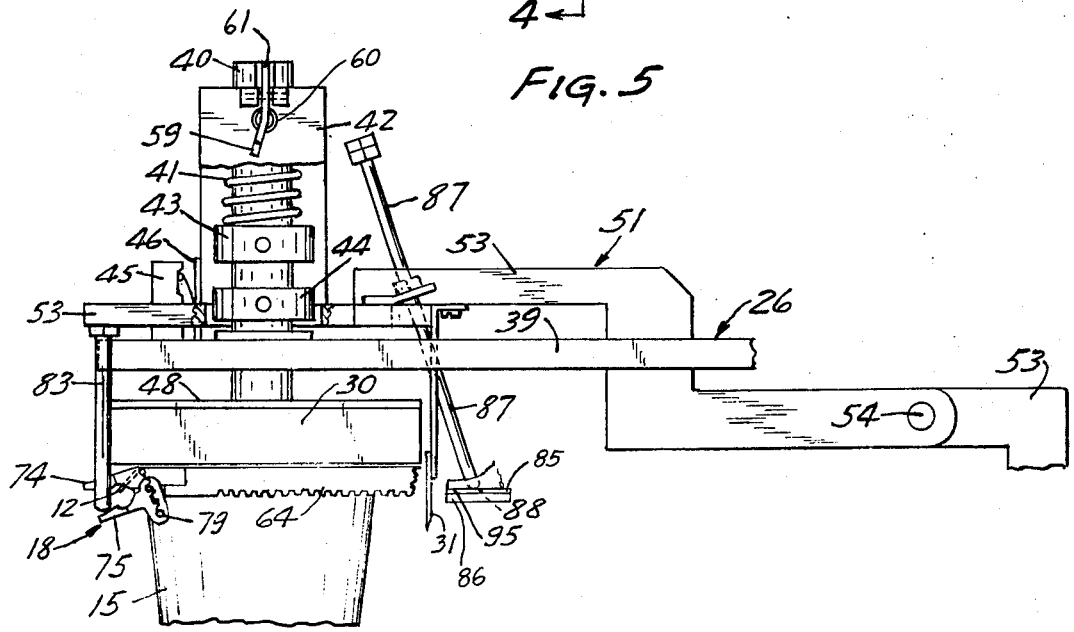
FIG. 5 is a fragmentary view similar to FIG. 3, but shown with a knife on the device in a sever position and a clamp assembly open.

The platen 30 comprises a rectangular metal heat conductive housing 48 to which the rod 40 is attached, and a soft resilient circular pad 49 (e.g. ⅛ inch thick about 12 durometer silicone sponge rubber) fixed to the side of the housing 48 opposite the rod 40, which pad 49 defines the pressure surface 29. A thermostatically controlled heater is mounted on the housing 48 and is adapted to produce a sufficiently high temperature on the pressure surface 29 (e.g. 375° F) so that during the predetermined dwell time when the platen 30 presses the film against the cup sufficient heat will be transferred to fuse the film to the cup. The pad is sufficiently soft that during such dwell time it will conform around the lip of the cup, thereby fusing the film to the lip over an arc of at least 30° (said angle being measured on a section taken through the lip of the cup as is illustrated in FIG. 5) and providing much stronger adhesion between the film and the cup than would occur if the film were adhered only tangentially to the upper surface of the cup lip.

Figure 2:
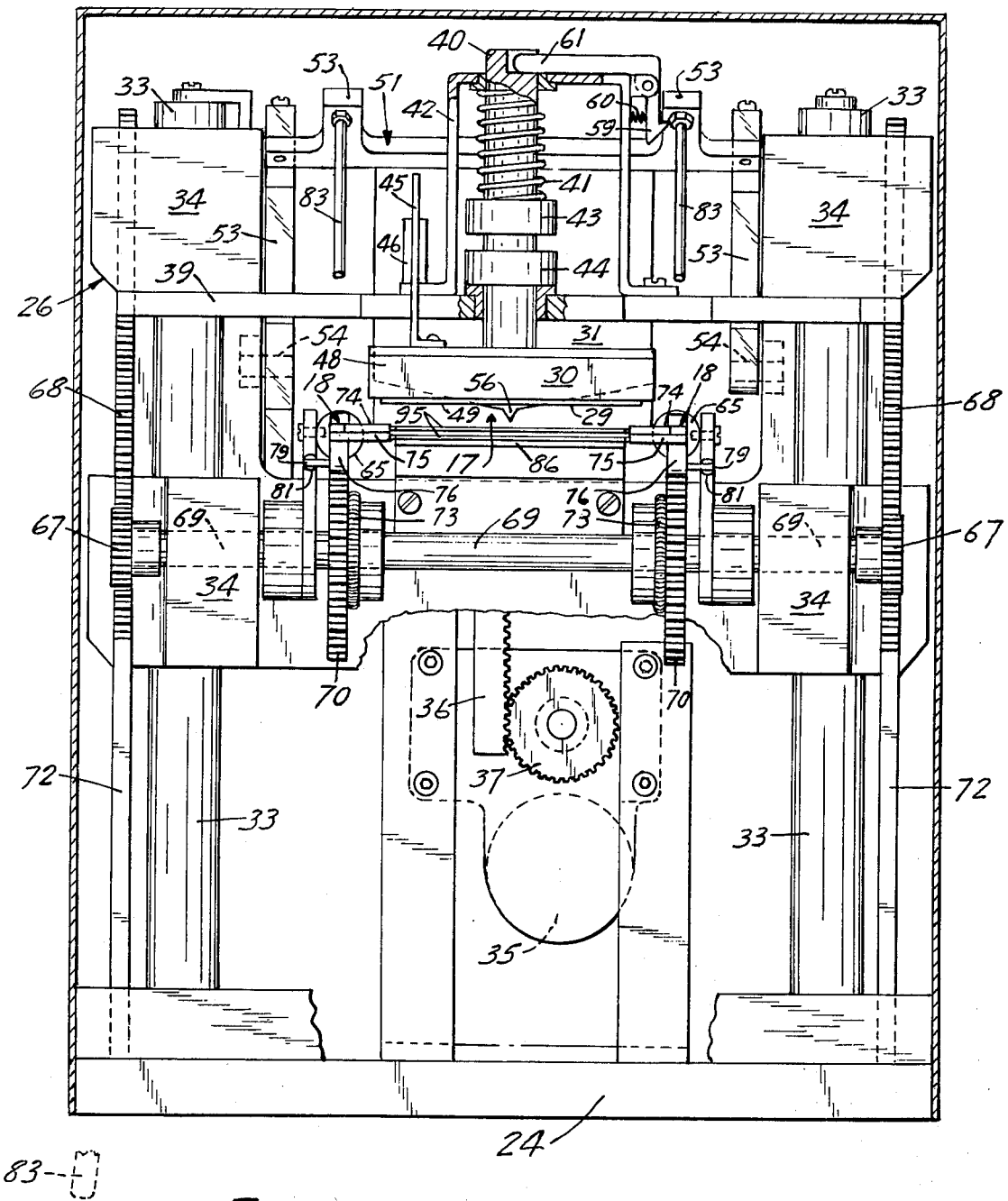
FIG. 2 is a vertical sectional front view of the device of FIG. 1 having parts broken away to show details.

The means for severing the film 12 comprises a knife support frame 51 included in the head assembly 26. The knife support frame 51 includes parallel arm portions 53 which fixedly support the knife 31 therebetween and are pivotal on pins 54 fixed to the support member 39. The knife support frame 51 is pivotal between a separated position (FIGS. 1 and 4) at which an edge of the knife 31 is spaced from the film 12 extending along the path between the first and second positions, and a sever position at which the knife 31 intersects that path (FIG. 5). The edge of the knife 31 has a pointed outwardly projecting central portion 56 adapted to first engage the film 12 along the path as the knife support frame 51 moves from its separated to its engage position under the influence of gravity, and is shaped to transversely sever the film 12 in both directions subsequent to such engagement as the knife 31 passes through the path. The separated position of the knife support frame 51 is defined by engagement of a hook 59 under one of the arm portions 53. The hook 59 is pivotably mounted on the support member 39 and is biased by a coil spring 60 (FIG. 2) into such engagement. A projecting bar-like portion 61 of the hook 59 has an end resting on the terminal end of the rod 40. Movement of the rod 40 relative to the support member 39 subsequent to engagement of the pressure surface 29 with a cup in the contact position of the head assembly 26 will pivot the hook 59 via the bar-like portion 61 to disengage the hook 59 from the adjacent arm portion 53 and allow the knife support frame 51 and knife 31 to fall to its sever position. Subsequent movement of the head assembly 26 from its contact position back to its spaced position causes a cam 62 attached to an end of one of the arm portions 53 to engage a roller 63 fixed on the frame 24 and pivot the knife support frame 51 back to its separated position at which the hook 59 will again engage and retain the arm portion 53.

The means for advancing the clamp assemblies 18 and an engaged end portion of the heat sealable film 12 along the path comprise a pair of racks 64 having terminal ends to which the clamp assemblies 18 are attached. The racks 64 are slidably mounted through slide bearings 65 fixed on the support member 39 to afford movement of the clamp assemblies 18 between their retracted and extended positions. Such movement is caused during movement of the head assembly 26 between its spaced and its contact positions by means including two partially toothed gears 67 each positioned so that certain of its teeth are engaged with teeth on one of two fixed clamp assembly drive racks 68 when the head assembly 26 is in its spaced position. The partially toothed gears 67 are in driving engagement with the racks 64 supporting the clamp assemblies 18 via a shaft 69 rotatably mounted on the support member 39, to which shaft 69 are fixed the partially toothed gears 67 and two gears 70. The number of teeth on the partially toothed gears 67 and the diameters of the gears 67 and 70 are selected so that movement of the head assembly 26 from its spaced position toward its range of contact positions will drive the clamp assemblies 18 from their retracted to their extended positions before the head assembly 26 reaches its range of contact positions. Subsequently when the last tooth of each of the partially toothed gears 67 leaves the associated clamp drive rack 68 it will slide along a planar surface 72 on that clamp drive rack 68, thereby stopping rotation of the partially toothed gears 67 and gears 70 so that the clamp assemblies 18 will not be driven beyond their second extended positions no matter how far into its range of contact positions the head assembly 26 subsequently moves. During such sliding movement the last tooth of each of the partially toothed gears 67 is held against the surface 72 of the associated clamp drive rack 68 by one of a pair of coil spring 73 attached between the support member 39 and the gears 70 and positioned so that rotation of the gears 70 to move the clamp assemblies 18 to their extended position will wrap the springs around the hubs of the gears 70. Upon return movement of the head assembly 26 from its range of contact positions toward its spaced position, the tooth of each of the partially toothed gears 67 sliding along the surface 72 of the associated clamp drive rack 68 will enter the teeth on that clamp drive rack 68 under the influence of one of the coil springs 73 and subsequent engagement between the racks 68 and gears 67 will return the clamp assemblies 18 from their extended to their retracted positions as the head assembly 26 completes its return to its spaced position.

The means for engaging an end of the supply length of the film at the cartridge assembly 17 also includes means for opening the clamp assemblies 18 at their extended positions to afford release of an applied length of the film 12, and means for closing the open clamp assemblies to afford engagement of an end portion of the film 12 at the cartridge assembly 17 by the clamp assemblies 18 as the open clamp assemblies 18 move to their retracted positions from their extended positions.

Figure 7:
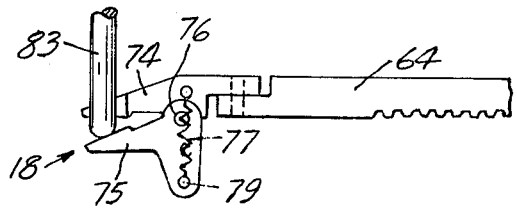
FIGS. 6 and 7 are fragmentary detail views of the clamp assembly in the device of FIG. 1 shown respectively closed and open.
Figure 6:
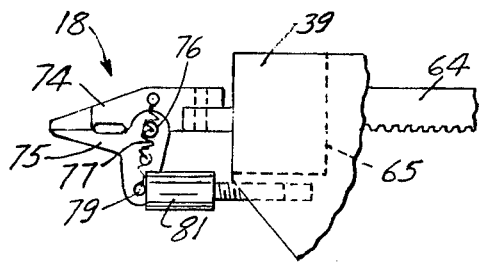

As is best seen in FIGS. 6 and 7, each clamp assembly 18 comprises a pair of jaws 74 and 75 having projecting terminal ends adapted for engagement on opposite sides of the film 12. One of the jaws 74 of each clamp assembly 18 is fixed to an end of a different one of the racks 64, while its other jaw 75 is pivotably mounted on the fixed jaw 74 at a pivot pin 76. The pivotal jaw 75 is movable to close the clamp assembly 18 and engage the terminal ends of the jaws 74 and 75 on opposite sides of the film 12, and to open the clamp assembly 18 so that the terminal ends of the jaws 74 and 75 are widely spaced and will move over the film 12. A coil spring 77 is tensioned between the jaws 74 and 75 of each clamp assembly 18 in a position so that its line of tension moves to an opposite side of the pivot pin 76 as the jaw 75 moves to open or close the clamp assembly 18, thereby providing a force to releasably retain the clamp assembly 18 either open or closed. A post 79 is fixed to the pivotal jaw 75 of each clamp assembly 18. The post 79 projects parallel to the pivot pin 76 and on the side of the pivot pin 76 adjacent the terminal end of the pivotal jaw 75. A resilient rubber bumper 81 is positioned on the support member 39 to engage the post 79 and move the pivotal jaw 75 to close the clamp assembly 18 as the clamp assembly 18 is moved to its retracted position, thereby causing the clamp assemblies 18 to engage the newly severed end of the film 12 as the clamp assemblies 18 are returned from their extended positions to their retracted position.

The means for opening the clamp assemblies 18 when the clamp assemblies 18 are in their extended positions comprises two push rods 83 fixed to the distal ends of the arm-like portions 53 of the knife support frame 51. One side of each fixed jaw 74 is relieved to allow the distal end of the adjacent push rod 83 to engage and move the associated pivotable jaw 75 to the open position of the clamp assembly 18 as the knife rack 51 drops to its sever position. Thus the predetermined length of the film 12 fused to the cup is released from the clamp assemblies 18 as it is severed from the supply length of the film 12 in the cartridge assembly 17, and the clamp assemblies 18 are opened for their subsequent return to their retracted positions.

The device 10 also includes means for preventing the supply length of film 12 from being pulled from within the cartridge assembly 17 as the film 12 is severed by the knife 31 due to resistance of the film 12 to severing by the knife 31. A pad 85 of a frictional material (e.g. 220 grit sandpaper) is positioned on a shelf-like portion 86 of the support member 39 for full width contact of the film 12 adjacent the outlet of the cartridge assembly 17. A weighted pressure rod 87 extends through a loose fitting opening in a ring-like member on a cross bar of the knife support frame 51, and has a tip 88 also covered by a frictional material. The rod 87 moves with the knife support frame 51 from a position with its tip 88 closely spaced from the film 12 when the knife support frame 51 is in its separated position, to a position at which the tip 88 of the rod 87 bears against the side of the film 12 opposite that contacted by the pad 85 of frictional material, which position is reached shortly after the knife support frame 51 starts to move from its separated position toward its sever position. The weight of the rod 87 is selected so that the pressure then applied between the rod 87 and pad 85 will restrict movement of the film 12 from within the cartridge assembly 17 as the film 12 is severed by the knife 31.

Figure 3:
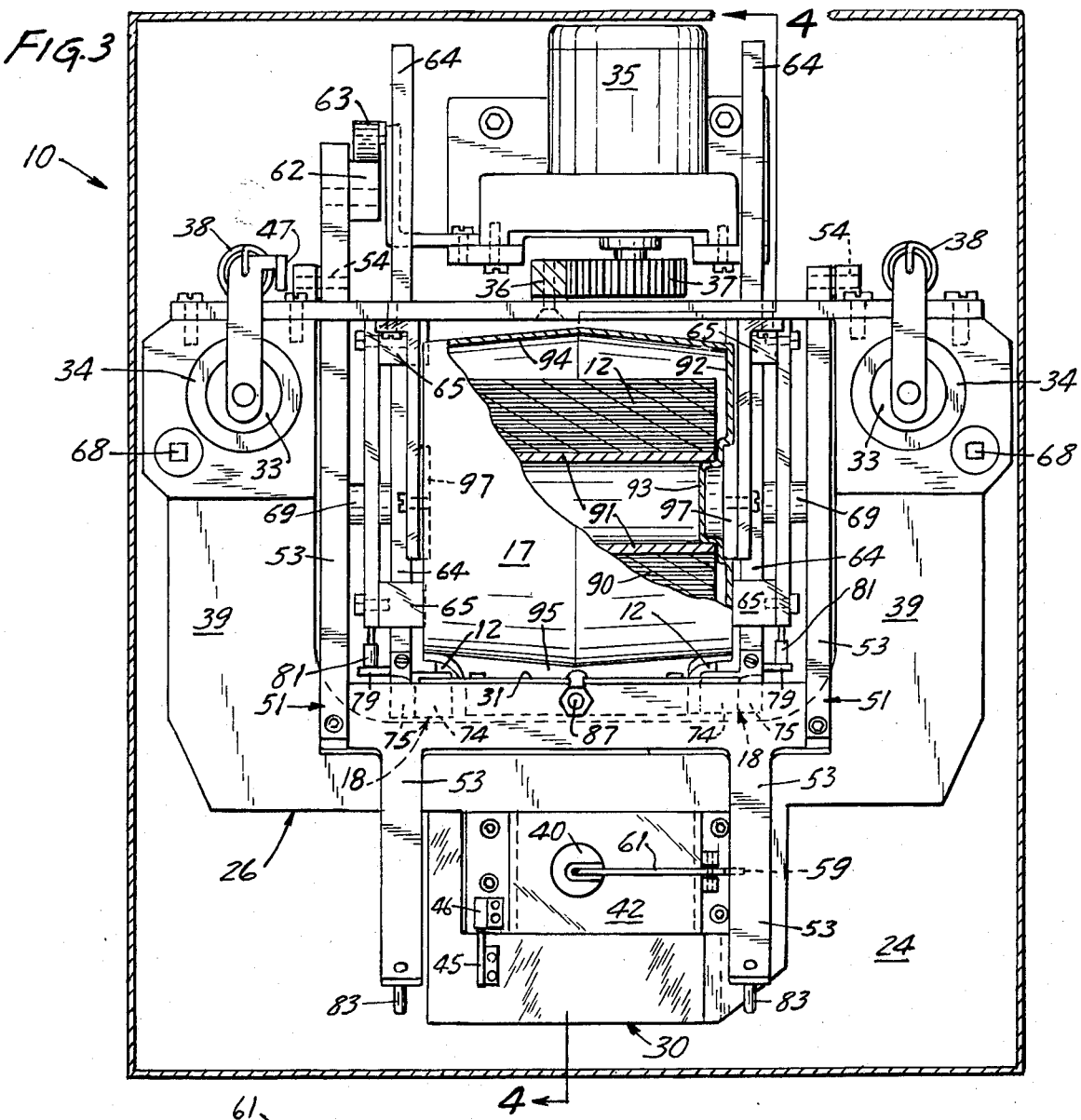
FIG. 3 is a horizontal sectional plan view of the device of FIG. 1 taken approximately along line 3—3 of FIG. 1 and having parts broken away to show details.

The cartridge assembly 17 is constructed to insure the cleanliness of the film 12 and afford easy loading of the film 12 into the device 10. The cartridge assembly 17, best seen in FIGS. 1, 3 and 4, comprises a cylindrical roll 90 of the heat sealable film 12 on a core 91, and a housing including end walls 92 having opposed centered cylindrical inwardly extending projections 93 rotatably supporting the core 91 for the roll of film 12. The housing also includes a generally cylindrical wall 94 joining the end walls 92 to enclose the roll of film 12 and having closely spaced ends transverse of the roll of film from which end closely spaced projecting walls 95 extend generally tangentially to the cylindrical wall 94. The projecting walls 95 are relieved adjacent the end walls 92 to afford engagement of the clamp assemblies 18 with the end of the supply length of film 12 supported between the projecting walls 95, and the projecting walls 95 are centrally notched to afford engagement of the tip pf the weighted rod 87 to press the film 12 therebetween against the frictional material on the shelf 86. The end walls 92 are also formed with grooves adapted to receive cartridge mating portions 97 of the support member 39 which removably support the cartridge with the projecting walls 95 aligned with the clamp assemblies 18 in their retracted positions.

The film applied by the device 10 could consist of a single material, or be a layered film (e.g. coated, laminated or coextruded film). Suitable films could include a polyester backed ethylene vinyl acetate copolymer, a thermoplastic coated paper or a polyolefin coated polyester. The main requirement for the film is that a heat sealable material forming at least one of its surfaces will fuse to the lip of a cup to form a tight seal upon the application of moderate pressure and heat, that the film has desired strength and barrier properties, and that the film is suitable for contact by the liquid or material being sealed within the cup. A preferred film comprises polyester coated with an ethylene vinyl acetate copolymer such as that sold under the trade designation "SCOTCHPAK - 112" by the Minnesota Mining and Manufacturing Company of Saint Paul, Minn. This film provides good adhesion to the lips of wax coated paper or foamed polystyrene paper laminate cups, and has a very high burst strength which is particularly desirable to restrict spillage when a sealed cup of liquid is tipped over.

The bosses 22 illustrated are especially formed to support and locate the bases of cups of two different diameters. An inner disk-like boss has a peripheral surface 98 adapted to engage and locate the inner surface of a cup having one base diameter, whereas a ring-like boss has an inner surface 99 concentric with and spaced outwardly from the peripheral surface 98 which is adapted to engage and locate the outer surface of a cup having a larger base diameter. Thus, the device can accommodate cups of different diameters as well as cups of different heights.

OPERATION

For operation, the head assembly 26 is initially positioned in its upper or spaced position. The clamp assemblies 18 are initially closed and are in engagement with an end portion of the film 12 in the relieved areas flanking the projecting walls 95 of the cartridge assembly 18. The knife support frame 51 is raised so that the knife 31 is spaced from the projecting walls 95 of the cartridge assembly 17. To seal a cup, the operator places the base of the cup against the appropriate one of the bosses 22 and presses a button 100 to activate the device 10. Upon such activation a control circuit for the device first starts the motor 35 in a direction to move the head assembly 26 toward the cup via the pinion 37 and rack 36. Such movement causes relative movement between the support member 39 and the clamp drive racks 68 and resulting rotation of each of the partially toothed gears 67 which, via the shafts 69 and gears 70, drive the racks 64 and attached clamp assemblies 18 from their retracted positions to their extended positions at which the engaged film 12 extends along a path adjacent the pressure surface 29 of the heated platen 30. Movement of the clamp assemblies 18 will terminate when they reach their extended positions because the last tooth of each of the partially toothed gears 67 then simultaneously leaves the teeth of the associated clamp drive rack 68 and subsequently those last teeth will slide along the planar surfaces 72 on the clamp drive racks 68 as the head assembly 26 moves into its range of contact positions and the pressure surface 29 engages the cup through the adjacent film 12. When such contact with the cup occurs, the heated platen 30 will move relative to the support member 39 against the bias of the spring 41 which applies force to form the pad 49 around the lip of the cup, until the relieved area of the cam arm 45 mounted on the platen 30 moves adjacent the actuator on the snap action switch 46 mounted on the support member 39. Such positioning allows the actuator to move, thereby causing the snap action switch 46 to pulse the control circuit and stop the motor 35 for a predetermined dwell time during which the heated platen 30 fuses the film 12 to the cup. Also during such movement of the platen 30 relative to the support member 39, the end of the rod 40 to which the platen 30 is mounted will move the hook 59, thereby releasing the knife support frame 51 so that it will fall to both cause the knife 31 to cut the film 12 adjacent the cartridge assembly 17 and cause the push rods 83 to impact and open the clamp assemblies 18.

After the predetermined time for fusing the film 12 to the cup has elapsed, the control circuit activates the motor 35 in a reverse direction, thereby causing the head assembly 26 to move back to its spaced position. During such movement, the last tooth of each of the partially toothed gears 67 again engages the teeth of the rack 64 under the influence of one of the springs 73 which were wound around the hubs of the gears 70 as the gears 70 drove the clamp assemblies 18 to their extended positions. Movement of the head assembly 26 subsequent to such engagement moves the clamp assemblies 18 back to their retracted positions adjacent which the jaws of the open clamp assemblies 18 first pass on opposite sides of the film 12 in the projecting walls 95 of the cartridge assembly 17 and the posts 79 then engage the bumpers 81 which close the clamp assemblies 18 in readiness for the next application. Also during movement of the head assembly 26 back to its spaced position, the surface of the cam 62 on the knife support frame 51 moves along the roller 63 mounted on the frame 24, causing the knife support frame 51 to move back to its spaced position where it is retained by reengagement of the hook 59 under the influence of the coil spring 60.

What is claimed is:

1. A device for applying predetermined lengths of a heat sealable film over the open end of a cup from a supply length of the film, said device comprising:
   clamp means comprising jaws having projecting terminal ends adapted for engagement with a said film, means mounting said jaws for relative movement between a closed position affording engagement of the terminal ends of the jaws on opposite sides of a said film and an open position at which the terminal ends of the jaws are spaced to afford movement of a said film therebetween, and means for releasably retaining said jaws at either their open or closed positions;
   means for advancing said clamp means from a first position to a second position, said positions being spaced a distance equal to said predetermined length;
   means at said first position for moving said jaws from said open position to said closed position to afford engagement of said jaws with an end portion of a said film;
   means at said second position for moving said jaws from said closed position to said open position to afford release of a said predetermined length of film upon application thereof to a said cup;
   means adapted for supporting a said cup in said device;
   means for providing relative movement between said means adapted for supporting and a said predetermined length of the film extending between said first and second positions, said means for providing relative movement being adapted to bring the lip of the cup into full circle engagement with one surface of the predetermined length of film;
   means for applying heat and pressure to fuse said predetermined length of film to the lip of said cup when the predetermined length of film is in engagement with the cup; and
   means for severing the applied predetermined length of film from the supply length of film.

2. A device according to claim 1 wherein said device further includes means for providing driving engagement between said means for providing relative movement and said means for advancing to move the end of a said strip of film from said first position to said second position during a first portion of said relative movement, and for terminating said driving engagement while maintaining the end of the strip of film at said second position during a second portion of said relative movement.

3. A device according to claim 1 wherein said means for applying heat and pressure comprises a pad of resilient low durometer material having a contact surface adapted to engage the surface of said predetermined length of film on its surface opposite the cup, means for heating the surface of the pad contacting the film, and means for applying force to press the pad toward and conform the pad to the lip of the cup over the film.

4. A device according to claim 1 wherein said means adapted for supporting a said cup comprises inner and outer projecting bosses, said inner boss having a peripheral outer surface adapted to engage the inner surface of the base of a said cup of a first diameter, and said outer boss having an inner surface concentric with said outer surface and adapted to engage the outer surface of the base of a said cup of a second diameter larger than said first diameter.

5. A device for applying predetermined lengths of a heat sealable film over the open ends of cups, said device comprising:
   a cartridge assembly comprising a cylindrical roll of said heat sealable film, a housing including end walls rotatably supporting said roll of heat sealable film therebetween, a cylindrical wall joining said end walls to enclose said roll of heat sealable film and having closely spaced ends aligned axially of said roll, and closely spaced projecting walls joined to the ends of said cylindrical wall and projecting generally tangentially of said cylindrical wall, said projecting walls having spaced relieved areas at their ends opposite said cylindrical wall to afford access to an end of the heat sealable film therebetween;
   two clamp assemblies, each clamp assembly comprising a pair of jaws having projecting terminal ends adapted for engagement with said film, means mounting said jaws for relative movement between a closed position affording engagement of the terminal ends of the jaws on opposite sides of said film and an open position at which the terminal ends of said jaws are spaced to afford movement of said film therebetween, and means for releasably retaining said jaws at either their open or closed position until a predetermined force is applied to change the position of said jaws;
   means mounting said clamp assemblies for movement between a first position with a different one of said clamp assemblies in each of said relieved areas and a second position, said positions being spaced a predetermined distance equal to said predetermined length;
   means at said first position for moving said jaws from said open position to said closed position to afford engagement of an end portion of said film by said clamp assemblies;
   means for moving said clamp assemblies for said predetermined distance;
   means adapted for supporting a said cup in said device;
   means for providing relative movement between said means adapted for supporting and said predetermined length of the strip material extending between said first and second positions, said means for providing relative movement being adapted to bring the lip of the cup into full circle engagement with one surface of the predetermined length of film;
   means for applying heat and pressure to fuse said predetermined length of film to the lip of said cup when the predetermined length of film is in engagement with the cup;
   means for severing the applied predetermined length of film from the supply length at the terminal end of said projecting walls; and
   means at said second position for moving said jaws from said closed position to said open position to afford release of said predetermined length of film upon application thereof to a said cup.

6. A device according to claim 5 further including means for providing driving engagement between said means for providing relative movement and said means for moving said clamp assemblies to move the end of a said strip of film from said first position to said second position during a first portion of said relative movement, and for terminating said driving engagement while maintaining the end of the strip of film at said second position during a second portion of said relative movement.

7. A device according to claim 5 wherein said means for applying heat and pressure comprises a pad of resilient low durometer material having a contact surface adapted to engage the surface of said predetermined length of film on its surface opposite the cup, means for heating the surface of the pad contacting the film, and means for applying force to press the pad toward and conform the pad to the lip of the cup over the film in an arc of at least 30°.

8. A device according to claim 5 wherein said means adapted for supporting a said cup comprises inner and outer projecting bosses, said inner boss having a peripheral outer surface adapted to engage the inner surface of the base of a said cup of a first diameter, and said outer boss having an inner surface concentric with said outer surface and adapted to engage the outer surface of the base of a said cup of a second diameter larger than said first diameter.

9. A method for applying predetermined lengths of a strip of heat sealable film over the open end of a cup, said method comprising:
   engaging an end of the strip of heat sealable film adjacent its terminal end;
   pulling the engaged portion of the strip along a path from a first position to a second position, said positions being spaced a distance equal to said predetermined length;
   relatively moving the cup and predetermined length of the film extending between said first and second positions to bring the lip of the cup into full circle engagement with one surface of the predetermined length of film;
   applying heat and pressure to fuse the predetermined length of film to the lip of the cup when the predetermined length of film is in engagement with the cup; and severing the applied predetermined length of film from the strip of film.

10. A method according to claim 9 wherein said step of applying heat and pressure comprises the steps of providing a pad of resilient low durometer material having a contact surface adapted to engage the surface of said predetermined length of film on its surface opposite the cup, heating the surface of the pad contacting the film, and applying force to press the pad toward and conform the pad to the lip of the cup over the film in an arc of at least 30°.

* * * * *